United States Patent

Balogh et al.

[11] Patent Number: 5,158,158
[45] Date of Patent: Oct. 27, 1992

[54] VERTICALLY DISPOSED WHEEL CHOCK FOR TANDEM WHEELS

[76] Inventors: John Balogh; Pearl Balogh, both of 219 Old Hunters Point Pike, North, Lebanon, Tenn. 37087

[21] Appl. No.: 712,749

[22] Filed: Jun. 10, 1991

[51] Int. Cl.5 .................................. B60T 1/04
[52] U.S. Cl. .............................. 188/2 R; 188/74
[58] Field of Search .............. 70/226; 188/2 R, 4 R, 188/32, 36, 74, 72.6, 72.9

[56] References Cited

U.S. PATENT DOCUMENTS

| | | | |
|---|---|---|---|
| 3,548,975 | 12/1970 | Herndon | 188/2 R |
| 3,712,474 | 1/1973 | Swan | 188/2 R |
| 4,582,176 | 4/1986 | Roberts | 188/32 |
| 4,694,936 | 9/1987 | Jackson | 188/2 R |
| 4,715,480 | 12/1987 | Anderson | 188/74 |
| 4,934,489 | 6/1990 | Jackson | 188/36 |

Primary Examiner—Robert J. Oberleitner
Assistant Examiner—Chris Schwartz
Attorney, Agent, or Firm—Fleit, Jacobson, Cohn, Price, Holman & Stern

[57] ABSTRACT

A vertically disposed wheel chock for tandem wheels which engages the opposed tread surfaces of the tandem wheels. The wheel chock includes a pair of members which can be moved toward and away from each other and each member being wedge-shaped and including side plates with inclined edges for engagement with the opposed curved tread surface of pneumatic tires on the tandem wheels. The members are securely engaged with the tire tread surfaces above and below the rotational axes of the wheels to prevent the tandem wheels from rolling in relation to a support surface.

3 Claims, 1 Drawing Sheet

VERTICALLY DISPOSED WHEEL CHOCK FOR TANDEM WHEELS

BACKGROUND OF THE INVENTION

1. Field of the Invention

The present invention generally relates to a vehicle wheel chock and more specifically to a vertically disposed wheel chock for tandem wheels which engages opposed tread surfaces on the pneumatic tires on a pair of tandem wheels. The wheel chock includes a pair of longitudinally movable members with each member including a wedge-shaped member for engagement with the curved tread surface of a pneumatic tire on each tandem wheel with one member engaging the tread surfaces below the axes of rotation of the wheels and the other member engaging the tread surfaces above the axes of rotation of the wheels. A mechanism moves the members toward each other and locks them in tire engaging position in a manner to prevent the tandem wheels from rolling in relation to each other and a support surface.

2. Description of the Prior Art

Wheel chocks of generally wedge-shaped configuration are well known and are employed to prevent a vehicle wheel from rolling along a supporting surface. When a vehicle such as a truck, semitrailer, recreational vehicle and the like is equipped with tandem wheels, efforts have been made to provide chocks positioned between the adjacent tandem wheels to prevent the wheels from rolling. The following U.S. patents relate to wheel chocks of this general type.

U.S. Pat. No. 3,548,975
U.S. Pat. No. 3,712,424
U.S. Pat. No. 4,694,936
U.S. Pat. No. 4,715,480
U.S. Pat. No. 4,934,489

While the above patents disclose various types of chocks, none of the patents discloses the specific structure of the movable wedge-shaped members and the interconnection between the members and the mechanism for moving the movable members as incorporated into this invention.

SUMMARY OF THE INVENTION

An object of the present invention is to provide a wheel chock for tandem vehicle wheels to prevent the wheels from rolling along a supporting surface with the chock being vertically disposed and positioned between the tandem wheels and including movable wedge-shaped member having oppositely inclined surfaces to engage the opposed tread surfaces on the pneumatic tires on the tandem wheels to prevent rolling movement of the tandem wheels.

Another object of the invention is to provide a tandem wheel chock as set forth in the preceding object in which each of the wedge-shaped members includes a pair of parallel side plates with each side plate having inclined edges to engage the opposed tread surfaces above and below the axes of rotation of the tandem wheels.

A further object of the invention is to provide a wheel chock in accordance with the preceding objects in which the side plates forming each member are interconnected by a shaft with a flexible member, such as a belt, interconnecting the shafts to enable the shafts and thus the movable members to move toward or away from each other when one of the shafts is rotated to wind the belt thereon or enable the belt to unwind therefrom.

Still another object of the invention is to provide a wheel chock in accordance with the preceding objects in which the rotatable shaft is provided with an end portion receiving a transversely extending handle which extends diametrically of the shaft and laterally beyond the shaft to provide a substantial lever to rotate the shaft with the shaft also including a cross pin rigidly affixed thereto to engage a latch pin removably inserted in one of a plurality of circumferentially spaced openings in a stationary washer for selectively locking the movable members in adjacent position in rigid frictional engagement with the wheels for locking the wheels against rolling movement.

A still further object of the invention is to provide a wheel chock in accordance with the preceding objects in which the side plates are constructed of wood to reduce the weight and cost of the chock while enhancing the appearance characteristics thereof.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
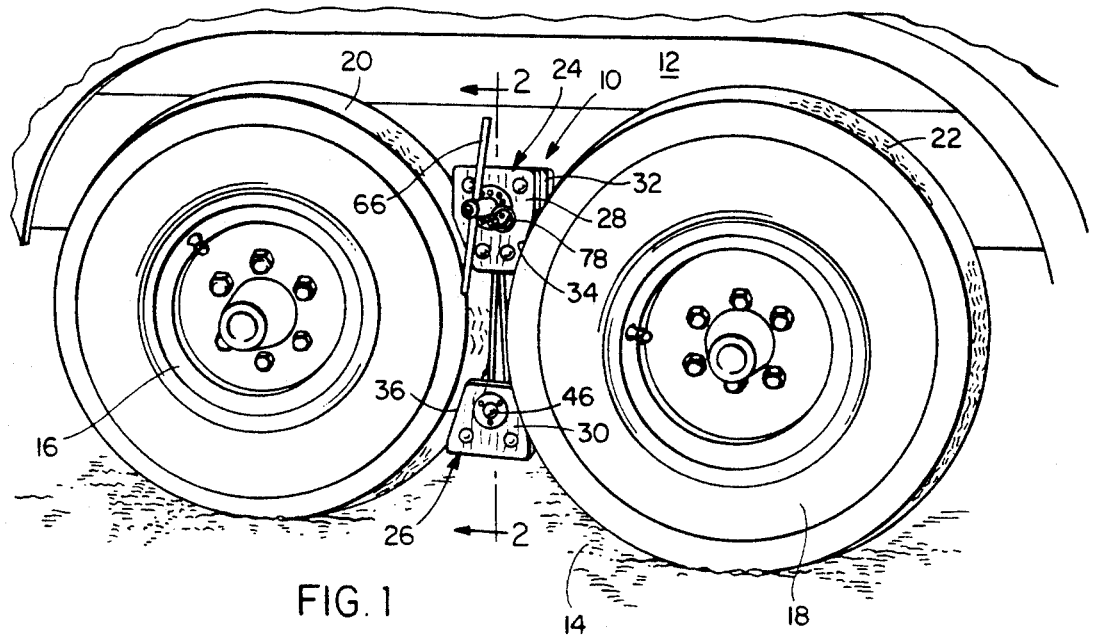
FIG. 1 is a perspective view of the vertically disposed tandem wheel chock of the present invention illustrating its association with the tread surfaces of opposed tandem wheels.
Figure 3:
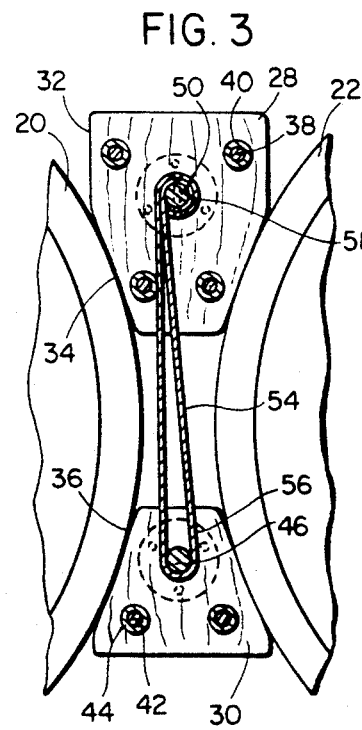
FIG. 3 is a sectional view illustrating the structural details of the mechanism for expanding and retracting the wheel chock.

Referring now specifically to the drawings, the wheel chock of the present invention is generally designated by a reference numeral 10 and is supported vertically between tandem wheels 16 and 18 rotatably mounted on an over the road vehicle such as a truck, semitrailer, recreational vehicle 12 or similar vehicle with the wheel chock 10 engaging the opposed curved tire tread surfaces 20 and 22 as illustrated in FIGS. 1 and 3 to prevent the wheels from rolling along support surface 14.

The wheel chock 10 includes a pair of movable wedge-shaped members 24 and 26 with member 24 including a pair of parallel, spaced side plates 28 and member 26 including similar side plates 30. The side plates are constructed of wood which can be stained or otherwise finished to provide a relatively lightweight, inexpensive and attractive wheel chock.

Figure 2:
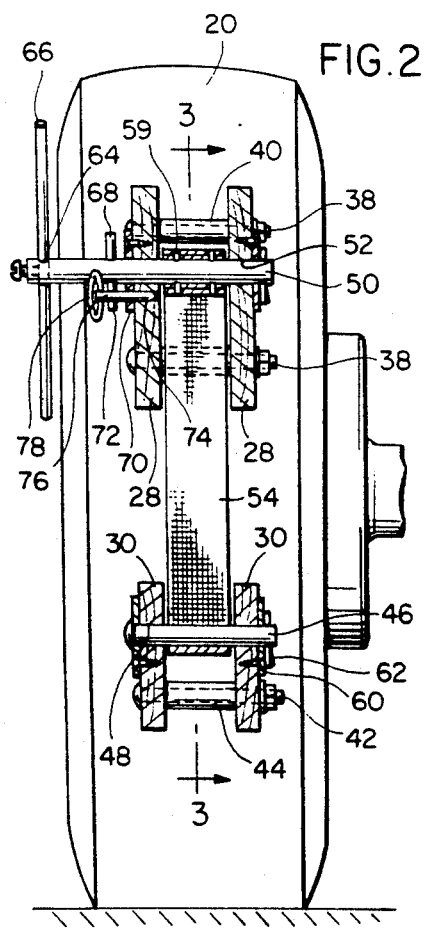
FIG. 2 is a sectional view, on an enlarged scale, taken substantially upon a plane passing along section line 2—2 in FIG. 1 illustrating the structural details of the wheel chock.

The outer and inner end edges of each of the side plates 28 and 30 are parallel and the inner edges are shorter than the outer edges. The side plates 28 have parallel side edges 32 provided with inclined converging inner corner portions 34. The side edge 36 of side plates 30 are inclined and converging towards the inner end edges substantially throughout their length. The side plates 28 are interconnected rigidly by carriage bolts 38 which are spaced from each other as illustrated in FIG. 2 with each of the bolts 38 including a spacer 40 thereon in the form of a hollow wooden dowel to maintain the side plates 28 in rigid, spaced parallel relation with the head and nut of the bolts 38 being partially recessed or countersunk into the outer surface of the side plates 28. By rigidifying the side plates 28 with the bolts 38 and spacers 40, the side plates 28 will be maintained in parallel relation.

The side plates 30 each include interconnecting bolts 42 and spacers 44 and a transverse shaft 46 extends fixedly through openings 48 in the side plates 30. The side plates 28 include a rotatable transverse shaft 50 which is journaled in aperture 52 in the side plates 28. With this construction, the bolts 38 and 42 maintain the side plates 28 and 30 in parallel relation to each other with shaft 50 being rotatable and the shaft 46 being non-rotatable.

In order to move the members 24 and 26, a flexible belt 54 interconnects the shafts 46 and 50 with the belt 54 including a loop 56 receiving the shaft 46 therethrough and ends 58 which are secured fixedly to the shaft 50 by rivets 59 or similar fastening devices. Thus, when the rotatable shaft 50 is rotated to wind the belt 54 thereon, the shafts 46 and 50 will be moved towards each other which moves the wedge-shaped members 24 and 26 toward each other and into rigid frictional contact with the tire tread surfaces 20 and 22. Reverse rotation of the shaft 50 enables the shafts 46 and 50 to move away from each other thereby enabling the members 24 and 26 to move away from the tire tread surfaces 20 and 22.

Each end of the shaft 46 is provided with a large metal washer 60 secured in place by a fastener such as a cotter pin 62. One end of the shaft 50 is provided with a similar washer 60 and pin 62. The other end of the shaft 50 extends outwardly beyond the side wall 28 and includes a diametric aperture 64 for receiving a rod-like handle 66 which can be in the form of a T-handle or the handle 66 may be oriented with only a short portion of its end inserted through the aperture 64 thus providing a greater lever arm by which the handle 66 can rotate the shaft 50. The aperture 64 may be a single diametric aperture or there may be two apertures oriented in perpendicular relation to each other to facilitate insertion of the handle 66 and rotation of the shaft 50. With the handle 66 inserted into the shaft 50, the shaft 50 may be rotated and the necessary force exerted by the handle 66 in order to securely lock the tandem wheels 16 and 18 against rolling movement on the support surface 14.

The shaft 50 is also provided with a diametrically extending and projecting rigid cross pin 68 that is positioned adjacent the side wall 28 as illustrated in FIG. 2. Positioned against the side wall 28 just inwardly of the cross pin 68 is a steel disc or washer 70 having a plurality of circumferentially spaced apertures 72 therein aligned with sockets or bores 74 in the side wall 28 to removably receive a latch pin 76 that has a sufficient length to extend into a position to block rotational movement of the cross pin 68 thereby preventing rotation of the shaft 50 after it has been rotated to lock the inclined end edges 34 and 36 against the tire tread surfaces 20 and 22. The latch pin 76 is provided with a finger receiving ring 78 to facilitate its insertion and removal from the apertures 72 and sockets or bores 74. The steel disc or washer 70 may be fixedly secured to the side plate 30 by the use of any suitable screw threaded fasteners.

Figure 4:
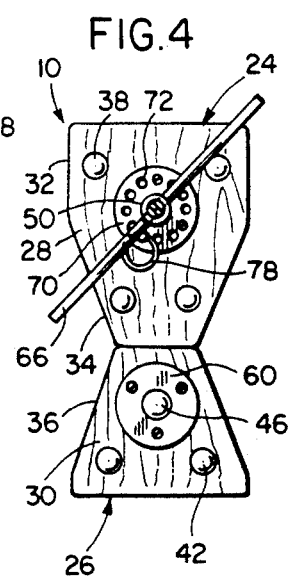
FIG. 4 is a side elevational view of the wheel chock in fully collapsed condition.

With this construction, the chock 10 may be stored conveniently while in retracted position as illustrated in FIG. 4 and when the vehicle is parked, a chock may be used with each set of tandem wheels. The chock is merely placed vertically between the tandem wheels 16 and 18 with either member 24 or 26 oriented in uppermost position above the rotational axis of the wheels and the other member oriented below the rotational axis of the wheels. The handle 66 is inserted and the shaft rotated when the latch pin 76 is removed. After the inclined edges 34 and 36 of plates 28 and 30 have been moved into secure frictional engagement with the tire tread surfaces 20 and 22, the latch pin 76 is inserted into an aperture 72 and bore 74 in a manner to prevent reverse rotation of the cross pin 68 and shaft 50 thereby securely locking the chock in secure frictional engagement with both wheels thereby preventing the tandem wheels from rolling along the support surface 14. When it is desired to remove the wheel chock, it is only necessary to rotate the shaft 50 a small distance to relieve pressure of the cross pin 68 against the latch pin 76 and then remove the latch pin and permit the shaft 50 to rotate in the opposite direction thus enabling the belt 54 to unwind from the shaft 50 and enabling the shaft 46 to move away from the shaft 50 which will enable the plates 28 and 30 to disengage from the tire tread surfaces 20 and 22. Thus, there is provided a lightweigt, dependable, longlasting and relatively simple and rugged wheel chock for tandem wheels. It is pointed out that other materials may be used in making the device and the flexible belt may be in the form of other types of flexible tension members such as cables, chains and the like.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A tandem wheel chock comprising a pair of aligned, vertically-disposed wedge-shaped members, said members including inclined means engaging opposed facing tread surfaces of a pari of tandem wheels and means interconnecting said members to move said member toward each other to force the inclined means thereon into frictional engagement with the facing tread surfaces of a pair of tandem wheels and enabling the members to move away from each other to disengage from the tandem wheels, said members being positioned above and below the rotational axes of the wheels to prevent rolling movement of the tandem wheels on a supporting surface when the inclined means on the members are engaged with the opposed facing tread surfaces of the tandem wheels, each of said wedge-shaped members including a pair of parallel and rigidly spaced side walls, said inclined means on each of said members being in the form of inclined edges on said side walls, said inclined edges extending inwardly in converging relation to provide a wedging action against the opposed tread surfaces on pneumatic tires on a pair of tandem wheels when the members are moved towards each other, said means moving the members including a pair of shafts extending between the side walls, one of said shafts being rotatably, a flexible member interconnecting said shafts and being wound on said rotatable shaft to move the shafts toward each other and moving said members towards each other to frictionally engage the tandem wheels.

2. The wheel chock as defined in claim 1 wherein said rotatable shaft includes a handle and lock means securing the rotatably shaft in position with said members in frictional locking engagement with the wheels.

3. A wheel chock for a pair of tandem wheels engaged with a generally horizontal support surface, said chock including a pair of generally vertically disposed, wedge-shaped members positioned in vertical alignment between the tandem wheels, each of said members including means on the outer surface thereof frictionally engaging the curved peripheral surface of a tandem wheel to prevent the wheels from rolling along the support surface, and means interconnecting said members to move said members toward each other and to permit movement of said members away from each other, each of said members including a pair of rigidly spaced parallel side walls, said interconnecting means including winch means having rotatable means on one member having a flexible component wound thereon, said flexible component being connected to the other member for moving said members toward each other when the flexible component is wound on said rotatable means.

* * * * *